United States Patent [19]

Bentley et al.

[11] Patent Number: 5,475,542
[45] Date of Patent: Dec. 12, 1995

[54] METHOD AND APPARATUS FOR IMPROVING INTER-BLOCK GAP LENGTH TOLERANCE AND LOCATE ACCURACY FOR WRITE APPENDS

[75] Inventors: Steven R. Bentley; Alex Chliwnyj; Steven D. Johnson; Sushama M. Paranjape; Ronald K. Rhodes, all of Tucson, Ariz.

[73] Assignee: International Business Machines Corporation, Armonk, N.Y.

[21] Appl. No.: 275,917

[22] Filed: Jul. 18, 1994

Related U.S. Application Data

[63] Continuation of Ser. No. 75,626, Jun. 14, 1993, abandoned.

[51] Int. Cl.[6] .............................. G11B 15/48; G11B 5/09
[52] U.S. Cl. ...................... 360/74.1; 360/50; 360/74.4
[58] Field of Search ........................ 360/50, 31, 93, 360/137, 90, 72.1, 72.3, 70, 75, 53, 74.1, 74.2, 74.5, 72.2, 74.4; 318/6; 235/153 A; 340/172.5, 174.1

[56] References Cited

U.S. PATENT DOCUMENTS

| | | | |
|---|---|---|---|
| 3,274,574 | 9/1966 | Miller et al. | 340/174.1 |
| 3,688,274 | 8/1972 | Cormier et al. | 340/172.5 |
| 3,711,691 | 1/1973 | Breitenbach et al. | 235/153 A |
| 4,125,881 | 11/1978 | Eige et al. | 360/50 |
| 4,176,380 | 11/1979 | Koski et al. | 360/50 |
| 4,389,600 | 6/1983 | Milligan et al. | 360/90 X |
| 4,393,445 | 7/1983 | Milligan et al. | 360/72.2 |
| 4,541,027 | 9/1985 | Danielsen et al. | 360/93 X |
| 4,570,187 | 2/1986 | Lode | 360/50 |
| 4,633,333 | 12/1986 | Blanco et al. | 360/31 |
| 4,692,819 | 9/1987 | Steele | 360/72.1 |
| 4,737,868 | 4/1988 | Kimura et al. | 360/74.4 |
| 5,117,288 | 5/1992 | Eisenhardt et al. | 348/409 |
| 5,331,479 | 7/1994 | Fry et al. | 360/53 |

OTHER PUBLICATIONS

Brentenbach et al, "Testing IBG Detection", IBM Technical Disclosure Bulletin, vol. 12, #7, Dec. 1969.

P J Badum, "On the Fly Intorrocord Gap Formation" IBM Technical Disclosure Bulletin, vol. 11, #8, Jan. 1969.

*Primary Examiner*—Aristotelis Psitos
*Assistant Examiner*—Patrick Wamsley
*Attorney, Agent, or Firm*—F. E. Anderson

[57] ABSTRACT

A method and apparatus for accurately locating targeted append points in a tape drive. The effects of interlayer slip (ILS) are eliminated and smaller IBGs are possible thus providing increased data capacity for a given tape cartridge. A coarse tachometer count is used in combination with the read dataflow to accurately locate the proper append point even with a small IBG size. The appended data are assured to be written using the proper tape velocity which virtually eliminates improper write appends and read temporary errors previously caused by ILS effects. The solution also guarantees that customer data previously written to the tape are not accidentally overwritten.

18 Claims, 5 Drawing Sheets

METHOD AND APPARATUS FOR IMPROVING INTER-BLOCK GAP LENGTH TOLERANCE AND LOCATE ACCURACY FOR WRITE APPENDS

The application is a continuation of application Ser. No. 08/075,626, filed Jun. 14, 1993, now abandoned.

BACKGROUND OF THE INVENTION

1. Field of the Invention

The present invention relates generally to tape drive performance enhancement and data reliability improvement and more specifically to a method and apparatus for accurately writing data to tape media having very high storage capacities.

2. Description of the Prior Art

For many years tape drive subsystems (hereinafter referred to as drive units) associated with data processing systems have used a single conceptual model for recording data on tape. While the specifics of the implementations have varied, data have historically been written to tape in units known as blocks. Blocks of data have been separated by a space on the tape medium known as an interblock gap (IBG). IBGs provide the ability to format recorded signals on the tape medium. Each IBG can be either an erased portion of the tape or a systematic pattern of data written to the tape easily recognizable by the drive unit as an IBG.

The required length of an IBG to effect proper tape drive subsystem performance depends on a number of factors. Such factors include the performance level of the transport motor (i.e. its ability to accelerate the tape) and the tape operating speed. IBG length can further be dictated by industry, national and international standards. High tape speeds and lower-acceleration transports require longer IBG lengths. On the other hand, shorter interblock gaps require lower tape operating speeds and/or higher performance transport mechanisms.

Certain types of applications require high speed tape movement over the read and write heads of the tape drive. Such applications include archiving, disaster recovery and other operations involving bulk data transfers. These types of applications are referred to in the industry as streaming applications. These applications require high tape speed movement to achieve a correspondingly high data transfer rate so that bulk data transfers can occur within a reasonable amount of time in order to meet customer requirements.

In these applications, a new read or write instruction is typically received by the drive unit either before or during the time when the IBG on the tape is passing the read and write heads. This should provide sufficient time for the new block of data to be processed within the drive unit for transmission to or read from the tape medium. In the case of a write append, if tape speed is too fast or the IBG length too short, a "backhitch" will be necessary because the new write command will not be ready for transmission to tape by the time that the write head reaches the end of the IBG. During a backhitch, the tape is brought to a stop downstream of the IBG, then driven in a reverse direction and caused to come to rest at a point upstream of the IBG. The tape then remains stationary until the write instruction has been fully processed by the drive unit, whereupon the tape is accelerated through the IBG such that it is at operational speed by the time the head is positioned one-half way through the IBG at the point when the write drivers are activated.

As mentioned above, these high speed applications, in order to function properly, have heretofore required either a longer IBG length or a higher performance transport system able to very quickly accelerate. Neither solution has been ideal since the former significantly reduces data storage capacity and the latter requires inclusion of an expensive component.

It can be seen that by increasing IBG length the resulting data capacity of a particular storage medium is decreased from what it would have been with shorter IBG lengths. While block data recording densities have increased from about 100 bytes per inch in the IBM 726 tape drive (announced in 1952) to about 77,000 bytes per inch in the IBM 3490E Tape Drive (announced in 1991), there has not been a corresponding increase in effective data recording densities due to the presence of IBGs.

While high performance tape transport mechanisms have correspondingly increased in performance over the years, they are considerably more expensive than their lower-performance counterparts. Moreover, tape wear is significantly increased with higher tape accelerations as is the possibility of tape damage. This is especially true as a result of the thinner tapes being used in the drives of today and those planned for the future.

One particular failure mechanism present with current tape drives is a result of Inter Layer Slip (ILS). The reduced tape thickness of recent and future tape media products increases the tendency of the tape medium to "slip" during winding or unwinding of the tape to or from a tape reel. The reel-to-reel tape drives of today operate under the assumption that the tape wound around each of the reels is at the correct tension and that there are no loose wraps between layers of the tape that might cause the reels to falter during the winding and reeling process.

In reality, various environmental factors can cause the tape wound on a reel to expand and contract thereby changing the tension in the reel and causing loose wraps. When the drive attempts to rotate these loose wraps on the reel hub, inter layer slip results. After initially loading a tape cartridge, ILS is most prevalent during the stop and start motions of a tape drive associated with a "write append" operation.

The write append operation is one of the more common operations performed by a tape drive. When new data are to be written to tape they can either be written after the end of all current data residing on the tape or they can be written over existing data on the tape. In the first case, data are written following the IBG written after the last data block and over an EOD (End of Data) mark. In the second case, data are written over existing data within the same area that defined a block for the overwritten data.

During a write append operation, the drive must first locate the IBG just before the intended append point by reading existing blocks using the read head. The write head physically leads the read head with respect to the tape movement. This is because the tape drive performs a read after write operation to verify the write. This must be done without rewinding the tape. Because the physical spacing between the read head and the write head is greater than the nominal length of an IBG, the write head has heretofore been positioned solely through the use of mechanically measured tachometer for a write append operation.

The interlayer slip that can occur during this stop/start/stop/start operation prevents the drive unit from accurately locating the IBG. This, in turn, results in a requirement that the IBG be of a larger size to ensure accuracy, thus degrading tape capacity.

If there is an undetected positioning problem during the write append it is possible that the previous block on the tape may be overwritten. Moreover, this error will not be detected until the read after write when it is too late to correct the problem. As can be imagined, this loss of customer data is unacceptable.

The use of a tach count alone to locate the IBG during a write append has an additional limitation. The drive starts writing a portion of the IBG and then customer data as soon as the appropriate tach count is observed. This does not guarantee that drive speed variations are contained within the allowable range to ensure a proper write. As a result of this speed variation, the beginning of the block is written at a different linear density. The variations may not be noticeable during the read verify after the write since the tape is moving past the read and write heads at the same linear velocity. This is especially true because of the small spacing between the read and write head elements in modern tape drives.

Thus, the data block will pass the read while write thresholds. Later, when the data are being read, the initial portion of the block becomes difficult to acquire in the logical forward direction since the data had been written at an improper linear density at the beginning of the block. A read temporary error is generated as a result. The data can then often be acquired only in read backward mode after the error recovery process (ERP) is initiated. The increase in read temporary errors and ERPs affects the drive unit reliability and overall processing speed.

SUMMARY OF THE INVENTION

Accordingly, it is an object of the present invention to provide a method and apparatus for storing large amounts of data on a relatively small amount of storage medium.

It is a further object of this invention to provide increased storage capacity while at the same time, allowing a high tape operating speed and a correspondingly high data transfer rate.

It is a still further object of this invention to achieve high data storage capacities by reducing the length of interblock gaps located on the storage media.

It is a yet further object of this invention to provide a high tape operating speed and a high data transfer rate with a lower performance transport mechanism.

It is an even further object of this invention to eliminate overwrite errors caused by Inter Layer Slip.

According to these objects, the tape drive apparatus embodying the invention is capable of accurately locating targeted append points in a tape drive. The effects of interlayer slip (ILS) are eliminated and smaller IBGs are possible thus providing increased data capacity for a given tape cartridge. A coarse tachometer count is used in combination with the read dataflow to accurately locate the proper append point even with a small IBG size. The appended data are assured to be written using the proper tape velocity which virtually eliminates improper write appends and read temporary errors previously caused by ILS effects. The solution also guarantees that customer data previously written to the tape are not overwritten.

BRIEF DESCRIPTION OF THE DRAWINGS

The above and further objects, features and advantages of the present invention will become more apparent from the following detailed description taken in conjunction with the accompanying drawings, wherein.

DESCRIPTION OF THE PREFERRED EMBODIMENTS OF THE INVENTION

Figure 1:
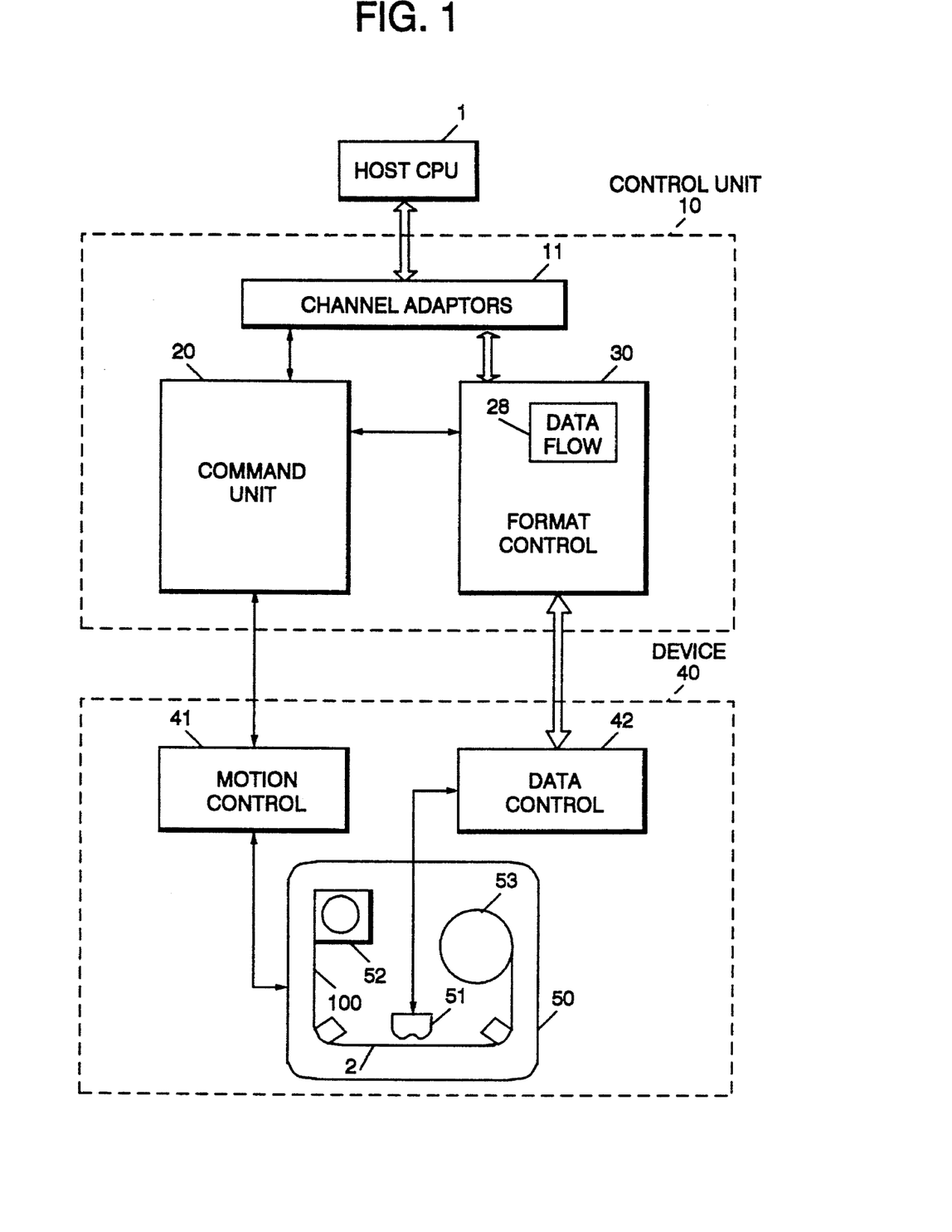
FIG. 1 is a schematic block diagram of a tape system embodying the invention.

Referring more particularly to the drawing, like numerals denote like features and structural elements in the various figures. The invention will be described as embodied in a magnetic tape drive for use in a data processing environment. Turning now to FIG. 1, a data processing system is controlled by at least one host central processing unit (CPU) 1 to store, retrieve, and manipulate data. The data processing system includes one or more tape systems. In the preferred embodiment, at least one of these tape systems is an IBM tape drive to be announced which uses a pre-defined data format described below.

The tape system further includes at least one control unit 10 and at least one magnetic tape recording or playback device 40. The control unit 10 accepts commands and data from the CPU 1 via one or more channel adapters 11, and controls the device(s) 40 accordingly.

The device 40 includes a motion control 41 for controlling the handling of magnetic tape media, a data control 42 including read and write circuits to operate a magnetic transducing head 51, and a tape path 50 (including a tape cartridge 52 having a tape supply reel therein and a tape take-up reel 53) for transporting magnetic tape 100 past head 51 for writing data to and reading data from tape 100. The data control 42 is coupled to a format control 30 in control unit 10, which is in turn coupled to channel adapters 11. Format control 30 further includes data flow 28 which, among other things, detects End of Block (EOB) marks located on the tape medium.

The motion control 41 is coupled to a command unit 20 in the control unit 10, which is also coupled to channel adapters 11. The command unit 20 accepts commands from the CPU 1 via channel adapters 11 and controls the mechanical operation of device 40. The command unit 20 further controls the flow of data between the channel adapters 11 and tape 100 via format control 30 and data control 42.

Figure 2:
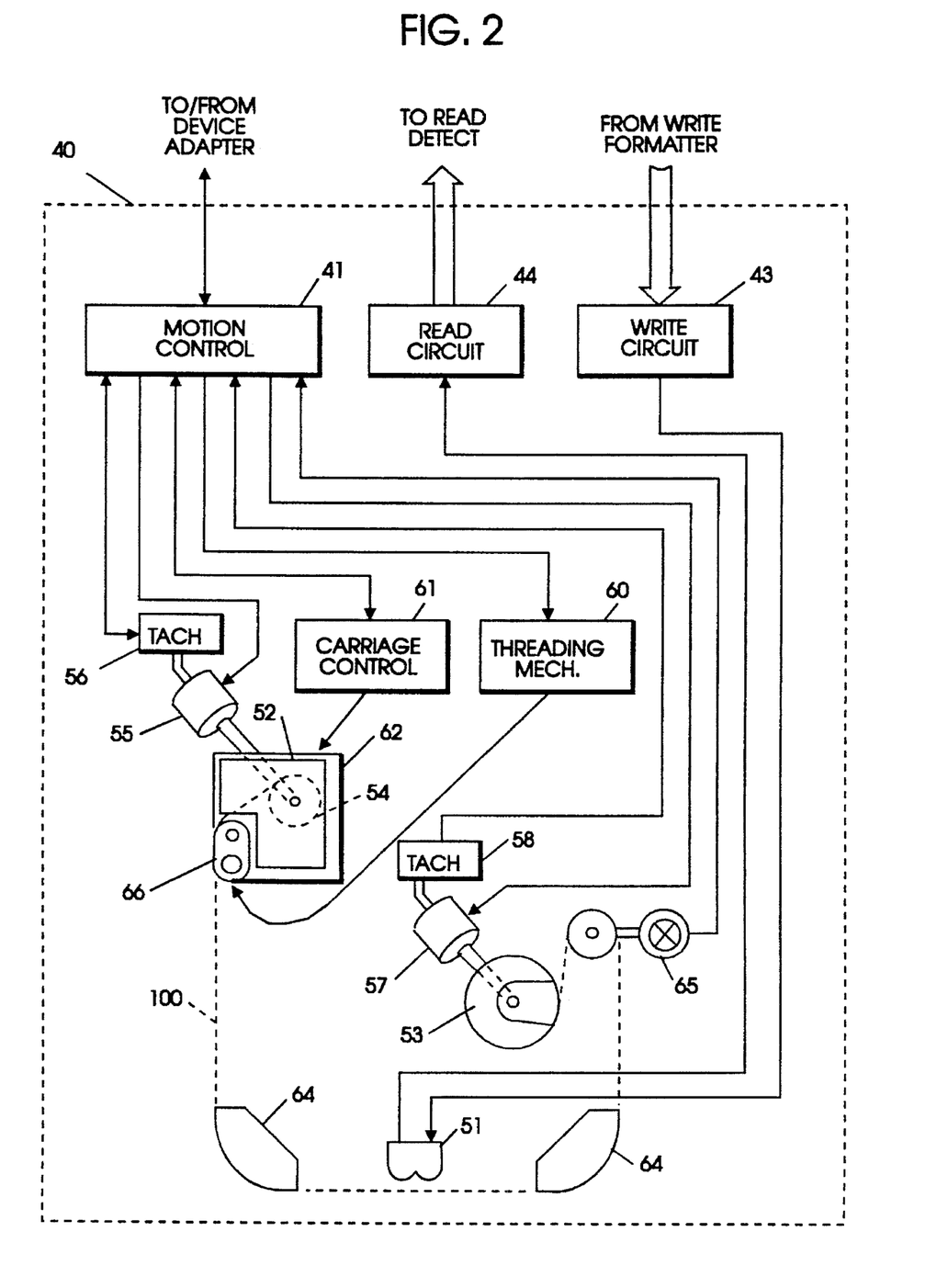
FIG. 2 is a schematic block diagram of the device in FIG. 1 shown in greater detail.

FIG. 2 shows the device 40 in greater detail. The movement of tape 100 in device 40 is controlled by the motion control 41, which includes a microprocessor and control store (not shown). The tape path includes a supply reel 54 in tape cartridge 52, a motor 55 for driving supply reel 54, a tachometer 56 for counting the number of revolutions made by supply reel 54, a take-up reel 53, a motor 57 for driving take-up reel 53 and a tachometer 58 for counting the number of revolutions made by take-up reel 53.

The tape path further includes various controls such as two compliant tape guides 64 and a tape tension control 65. The tape cartridge 52 is located in a carriage 62 which is coupled to a carriage control 61. A threading mechanism 60 threads tape 100 through the tape path and spools it upon the take-up reel 53 using the leader block 66.

The invention described herein is preferably embodied in an IBM tape drive to be announced in the near future. This tape drive employs a particular format for tape reading and writing which is now described. The format definition allows for recording and data retrieval on a total of 128 tracks. The term "tracks" refers to the individual regions down the length of the tape in which information is magnetically recorded.

The full complement of tracks is NOT read (or written) simultaneously. Instead, the totality of tracks is broken down into groups which can be read (or written) simultaneously by the single read head (write head). In the preferred embodiment of this invention, this group size is sixteen. Thus there are eight groups of sixteen tracks, each group being read or written individually.

It can thus be seen that to completely access data on a given tape cartridge, multiple passes are necessary. When reading or writing data, the tape direction is alternated between each pass so that for sequential processing there is no significant tape repositioning necessary during the required transitions between passes.

Figure 3A:
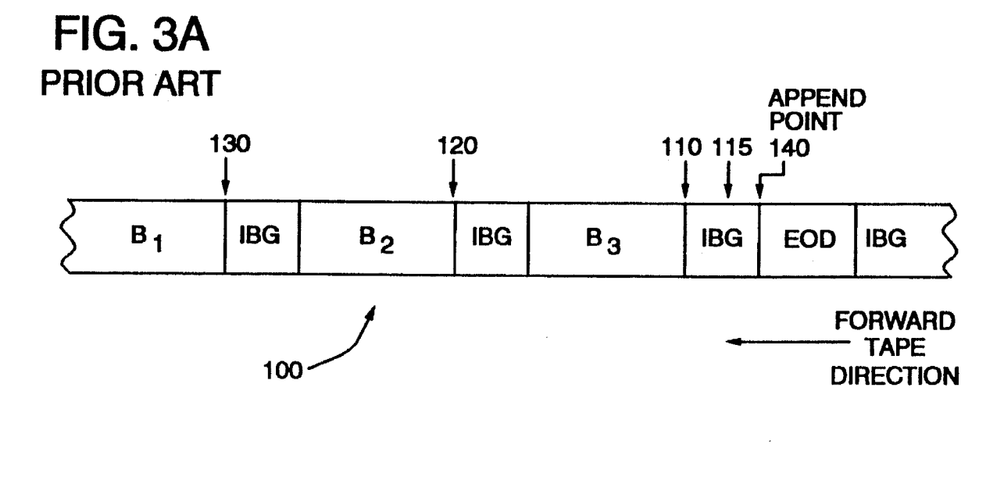
FIG. 3A is a representation of a portion of magnetic tape in a state prior to the implementation of a write append operation.

Turning now to FIG. 3A, the prior art method for accomplishing a write append is described with reference to the figure. It will be understood in the following descriptions of both the prior art method and apparatus as well as the invention herein that the write head and the read head of the tape drive are stationary and at a fixed distance from each other. This fixed distance is stored within motion control 41 of device 40. The value is used by the control microcode in a manner to be described below. For purposes of illustration, it is assumed that data are to be appended at append point 140. A portion of the tape 100 is shown. Data have previously been written to blocks $B_1$, $B_2$ and $B_3$. The host CPU 1 now sends down data through control unit 10 and to device 40, a portion of which is data to be written as $B_4$ beginning at append point 140. The write append operation of the prior art is accomplished in two passes, both of which are now described.

The write head will be positioned over a tape position somewhere upstream of the intended append point at the time that the write request is sent from the CPU 1. The specific position is determined so that at the time that the write circuit 43 is activated, the tape speed will be at operational speed. This position is typically about 50 mm before the intended append point which corresponds to at least one, but probably more than one, block. The exact lead time required is determined by the acceleration capability of the servo drive motors 55 and 57.

The following discussion assumes that the proper initial position is such that the read head is positioned relative to block $B_2$ before IBG 120. IBG 120 or any IBG can be sensed as a specific pattern of data by the data control 42 of device 40. In both the prior art drive and the preferred embodiment of this invention the particular bit pattern representing an IBG is a repeating series of eight zeros followed by a one. It is to be understood, however, that the microcode or the hardware of the device 40 could be programmed to write and sense any bit pattern as an IBG.

With the read head positioned upstream of IBG 120, the tape is now moved in the forward direction through IBG 120, through $B_3$ and until END OF BLOCK (EOB) for $B_3$ at 110 is sensed by data control 42. This position, in addition to being the termination of $B_3$, is the beginning of the IBG prior to append point 140. Once the beginning point of IBG 110 is reached, a signal from motion control 41 is transmitted directing tape movement to cease. The tape 100 then decelerates. The tape 100 will move some finite distance past EOB 110 as it decelerates. This tape location at EOB 110 is recorded as a mechanical tach count for use in the second pass. This completes the first pass and the second pass begins with a backhitch (tape move in the reverse direction) somewhere upstream of the stored tach count representing beginning of IBG position 110.

The tape may be backhitched to various places upstream and still accomplish the same result. It is important, however, to note that the amount of backhitch must be sufficient to permit tape speed to be brought up to operational speed by the time data are to be written on the second pass. A backhitch to the first half of $B_3$, for example, would be sufficient. As the second pass begins, tape 100 is advanced in the forward direction. The tach count is repeatedly compared with the previously stored tach count (representing point 115) as the tape 100 is advanced. At the point where the stored tach count matches the current tach count, the tape 100 is theoretically one-half way through IBG 110 at point 115.

Figure 3B:
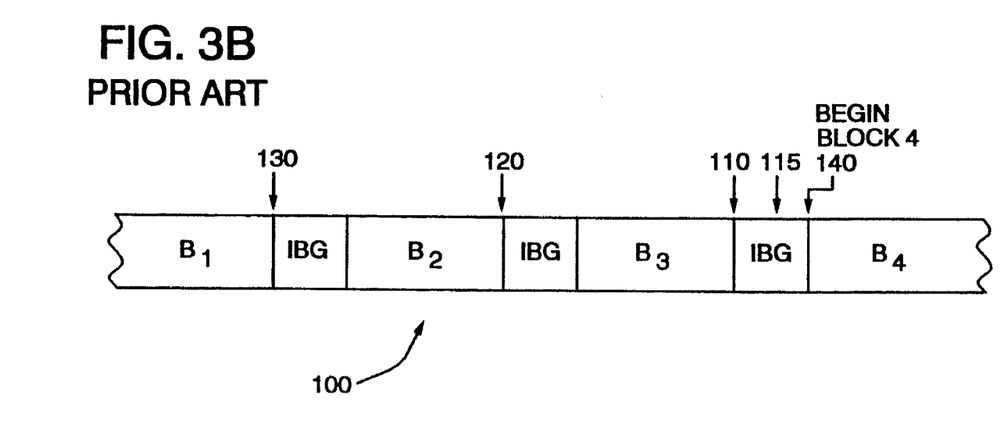
FIG. 3B is a representation of a portion of magnetic tape in a state after the implementation of a write append operation.

The procedure continues with data control 42 transmitting one-half of an IBG to be immediately written to tape 100 starting at point 115. Once this is completed the user data are appended starting at point 140. The tape, after the completed append of block $B_4$, is shown in FIG. 3B. As can be seen, various problems with the above-described prior art technique can occur depending on various physical influences which may occur during the write append operation. It should be noted, however, that the state of tape 100 in both the prior art and this invention, prior to and after the write append operation is as shown in FIGS. 3A and 3B.

The specific method of this invention for improving IBG length tolerance and locate accuracy is now described. The general procedure to be described involves the use of multiple IBG locations, in a first pass, for establishing the initial (coarse) position for the write append. On the second "write append" pass, the accuracy of the first pass positioning is predicted using read dataflow 28 and the write operation is either accomplished or inhibited based upon the predicted accuracy. In other words, a prior IBG location is checked to verify that its position has not moved from the first pass to the second pass as a result of, for example, the occurrence of interlayer slip.

The accuracy of append point detection is improved by using the end of block detection mechanism in combination with the tach count mechanism. The end of block detection mechanism (dataflow 28) provides a finer resolution at the bit level which is very difficult to achieve with even the most sensitive tachometers. Whereas the tach counts are used to provide the coarse resolution in quickly locating blocks, the end of block detection provides the accuracy required to permit the use of smaller IBG lengths even in the presence of such environmental difficulties as interlayer slip.

Figure 4:
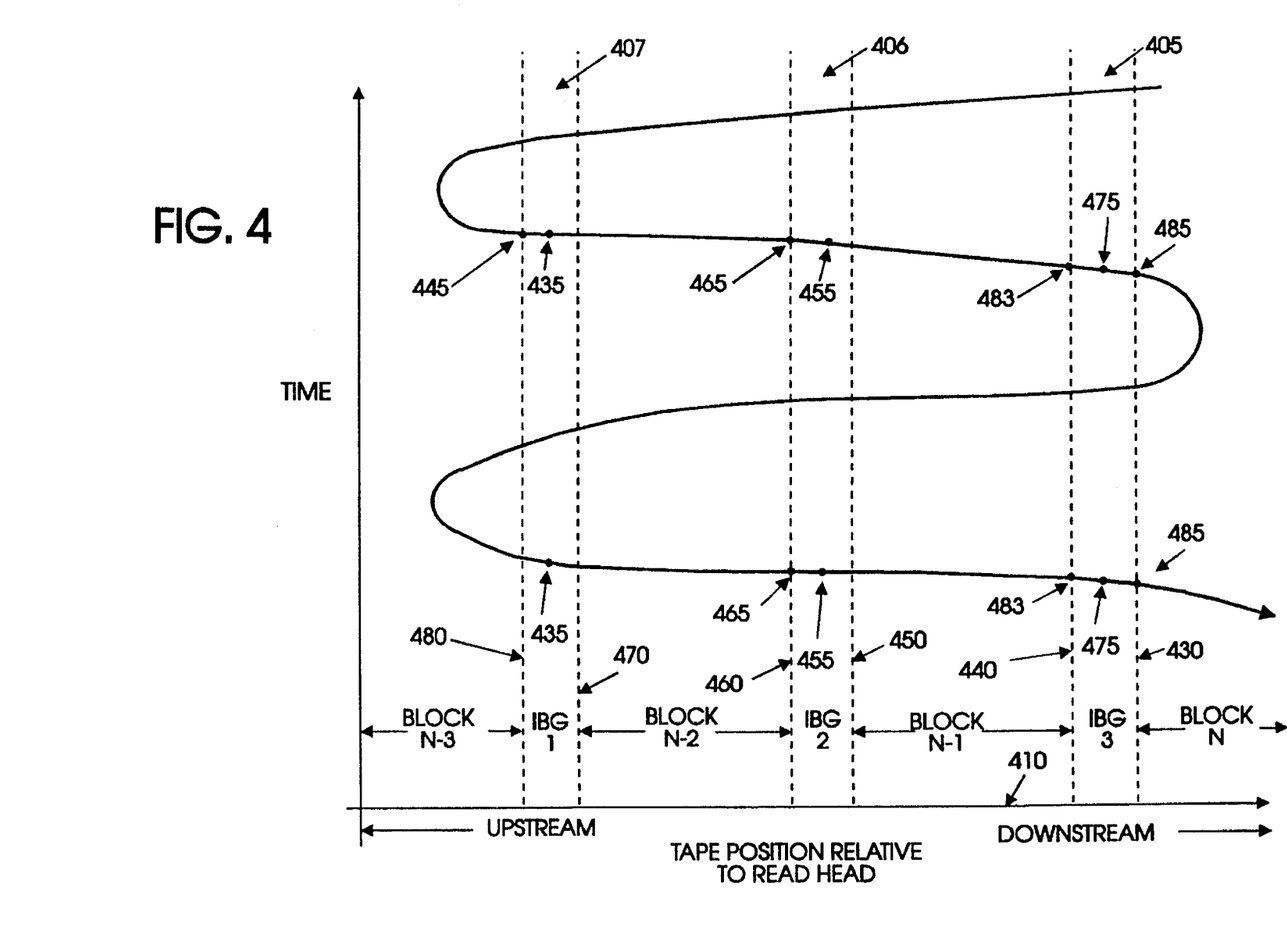
FIG. 4 is a diagrammatic illustration of tape motion when performing a write append operation in accordance with the invention described herein.

FIG. 4 is a plot showing the tape position versus time in the preferred embodiment of this invention. The plot shows tape movement occurring during the write append operation. Interblock gaps are indicated by dashed lines 430, 440, 450, 460, 470 and 480. The length of the interblock gap corresponds to the horizontal distance between the dashed lines.

Tape position scale 410 indicates the position of the magnetic tape 100 relative to the read head. A plot point to the left of one of the IBG sections indicates that a section of the tape 100 preceding the particular interblock gap is in contact with the read head.

A plot point between two of the dashed lines indicates that the particular interblock gap is in contact with the read head, and a plot point to the right of one of the IBG sections indicates that a section of the tape beyond the particular interblock gap is in contact with the read head. The following discussion describes tape movement during a write append operation wherein it is desired to append data after the third IBG at point 485 (corresponding to dashed line 430). It is assumed that at the time a write append instruction is transmitted to device 40, the read head is downstream of the third IBG. It is also to be observed that in the accompanying description, tape position is relative to the read head. The write head is a fixed distance downstream of the read head. This distance value is known to the data control 42 and, as will be seen below, is used in the calculation process for performing the write append operation.

It should also be noted that the write append operation which is to be described is done so in the context of a write append to a block not containing any data. This corresponds to an append where additional data are added and no data are overwritten. In this case the data block following the last IBG (IBG 3 405) written on the tape consists of an EOD (End of Data) mark. It is to be understood that the same write append procedure could similarly be used to perform a write append operation in which one or more data blocks are overwritten by one or more updated blocks of information. In this case block N after IBG 3 405 would contain previously written data which are to be overwritten.

Moreover, it is assumed that the tach counts required for the write append operation have not yet been obtained. This would be the case if a volume containing tape 100 was mounted specifically for the append operation to be performed. Thus, what is NOT described hereinafter is an append during streaming. This situation would be treated in the same way, however it would not require the below described read pass since the required tach counts would have been previously captured.

In performing the write append operation of this invention it is next assumed that after tape mount, the read head is located relative to a tape portion downstream of (logically past) IBG 3 405 and somewhere in the data block where data are to be written. The invention will be equally operable, however, no matter where the tape is relative to the read head at the time that the write append command is received from the control unit 10. The important action is moving the tape so that a portion somewhere upstream of IBG 1 407 lies under the read head. In the example corresponding to FIG. 4, a tape section lying downstream of IBG 3 405 lies under the read head at the time that the write append command is received.

Figure 5:
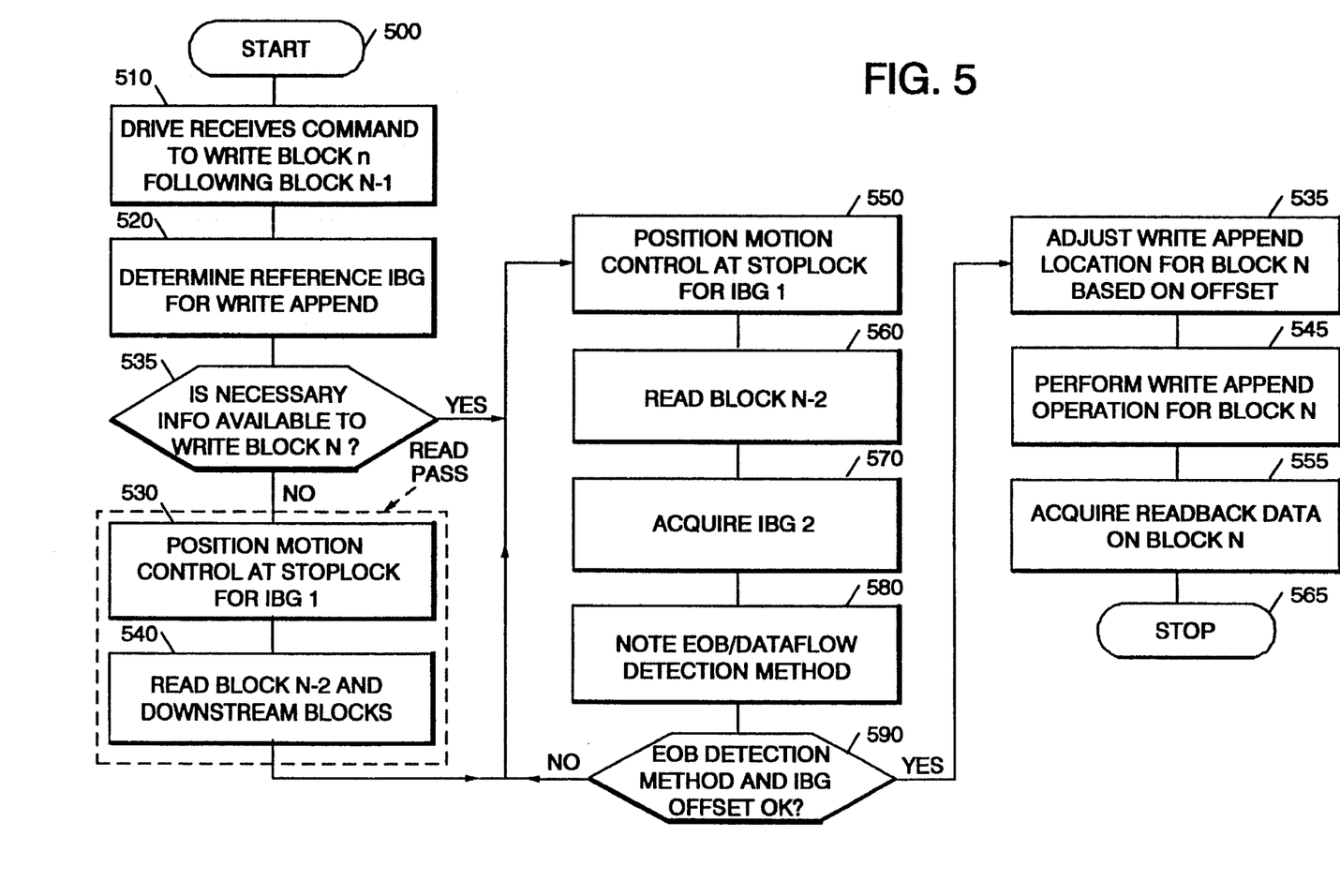
FIG. 5 is a flow diagram illustrating the process for performing a write append operation in accordance with the teachings of the invention.

The description following is further illustrated in FIG. 5 which is a block diagram of the method of this invention. At step 510, the control unit 10 of the tape drive receives a command directing that the tape device write block N in an intended write append location following the IBG which follows block N-1. At this point, control unit 10 must determine the reference IBG for the write append. This occurs at step 520 and is accomplished as follows.

The tape 100 is transported in the reverse direction ("backhitched") until a point upstream of IBG 1 407 lies under the read head. In this example, the tape is moved until block N-3 lies underneath the read head where N is the notation representing the block to be appended. It is to be understood that the tape can be backhitched to any block before the N-3 block (i.e. an N-4 block) in the preferred embodiment of this invention.

The required backhitch distance is determined by the read-write head gap length as well as the block size of the blocks in the vicinity of the block to be appended. If the blocks located upstream of the intended append point are relatively small and the gap length is large, a correspondingly larger backhitch will be required. It is also important that the tape be backhitched a sufficient distance within the block (in this case N-3) so that once the direction is reversed, the tape can be accelerated to operable reading speed by the time it reaches the beginning of IBG 1 407. This position is termed the stoplock for IBG 1 407 and reflects the minimum position upstream of IBG 1 407 required to be at operable speed by the time IBG 1 407 is reached. The stoplock position is calculated by motion control 41. As would be expected, the further that the tape is required to be backhitched, the more time required to perform the write append.

The reference IBG must be determined to account for read/write head spacing. It is assumed that block N-1 is of sufficient size to encompass that spacing. Therefore, the IBG preceding block N-1 is the reference IBG and block N-2 must be read to acquire this position.

At step 520, once the reference IBG has been located, the control unit 10 must determine whether it has the necessary information to proceed with the second (append) pass. The control unit 10 must have stored tach counts for comparison during the upcoming append pass. If the tape cartridge has been in the drive for some time prior to receipt of the command at step 500, and previous reads and writes to tape 100 have been performed, then the tach counts for the EOB for blocks N-1, N-2 and N-3 will already be known to the control unit 10. If this is the case, then the completion of the first (read) pass is unnecessary and processing goes directly to the append pass beginning at step 550. The case that will be described, however, assumes the insertion of the tape cartridge in the drive primarily for the purpose of a new write append following the end of data on tape. In this case it is necessary to perform the read pass and processing continues at step 530.

Once the tape 100 is positioned so that block N-3 is under the read head (at the stoplock for IBG 1 407), the tape is transported in the forward direction. This movement of the tape will be referred to herein as the first pass or "read pass". As the tape 100 is moved forward, the read head, in combination with the circuitry contained within data control 42 is able to detect specific points on the tape 100. This result is accomplished via the particular data formats located on the tape such as trailers and leaders. This technique is well known in the art and, as such, will not be described herein.

When point 445 (known as an EOB or End of Block) is positioned underneath the read head, a tach count for this position increased by one half of an IBG length is stored in data control 42. This count effectively corresponds to point 435 which represents the midpoint of IBG 1 407. As will be seen below, this information is used for alignment purposes in the second, or append pass, of the write append operation.

The tape 100 continues in the forward direction at step 540 through block N-2 until it reaches the EOB for block N-2 which corresponds to the beginning of IBG 2 406. When positioned under the read head, point 465 is detected and the corresponding tach count is increased by one half of an IBG length and is stored in data control 42 (point 455). Tape 100 further continues through block N-1 until EOB for this block is reached signifying the beginning of IBG 3 405. As before, a tach count representing point 475 is stored in data control 42 for later use in the append pass. As was mentioned above, if the drive is in a streaming mode, the read pass will be unnecessary since the required tach counts would be already stored.

Once these tach counts are stored, the tape is again backhitched at step 550 to the N-3 block at the stoplock for IBG 1 407. The tape direction is again reversed to the forward direction and thus begins the append pass. Block N-2 is read at this time at step 560. As the tape is moved forward under the read head, the detection circuitry in device 40 begins to check for the location on tape representing the beginning of IBG 2 406. This is illustrated as step 570 in FIG. 5. When the detection circuitry determines the EOB for block N-2 to be relative to the read head, the position can be determined at the bit level, with a much greater degree of accuracy than with the tachometer. This position detection and calibration is derived from the dataflow logic 28. The dataflow position of the EOB for the N-2 block is added to one-half the length of a nominal IBG and then compared with the previously stored tach count corresponding to point 455. Once the comparison is completed, the method of EOB detection is compared at step 580 with that used during the read pass. As will be seen, it is imperative that the same method of detection is employed for accurate results.

One of two things can happen at this point and a decision is made at step 590. It may be determined that the difference between the read pass tach count and the dataflow reading is greater than a preset threshold. If this is the case then the write operation is aborted and the error recovery procedures invoked. It should be noted that the difference will most likely be greater than the threshold if ILS occurred between the time of storing the tach count during the read pass and generating a dataflow value during the append pass. Also, if an inconsistent method of EOB detection was used, then the process must invoke error recovery procedures and attempt the append pass again.

A second possibility is that there is a small error (less than the preset threshold) or no error at all. In this case, the write operation continues in the following manner. Since the write head is downstream of the read head it is closer to the intended append point 485 than the read head. As a result, the difference between the read pass tach count and the dataflow position for the midpoint of IBG 2 406 is stored as an offset. The tape must be adjusted by the amount of this offset from the tach count at the intended append point 485. Thus, the tape is continually moved in the forward direction until the tach count (adjusted by the offset and the write-read gap) is reached. This tach count will correspond with point 475 in FIG. 4. This step is illustrated in FIG. 5 as step 535.

Once this tach count is reached, the write circuit 43 is enabled at step 545, and one half of a nominal IBG is written. The tape speed will be up to operable writing speed by the time the one half IBG is written. Following the one half IBG, the data block is written and then read verified at step 555. Additional data blocks can be written thereafter. These blocks are separated by an IBG and after the final data block is written, an end of data (EOD) mark is written to the tape.

It can thus be seen that through the use of the foregoing procedure, which employs the tach count and the dataflow logic 28 in conjunction, ILS causing inadvertent overwrites of customer data is eliminated. Since essentially all ILS occurs during the stop and start of the tape, (during periods of high torque on the tape reels) the above described method virtually eliminates positioning errors due to ILS that heretofore had occurred during the write append operation.

Moreover, the technique requires the dataflow logic 28 to read two or more upstream blocks properly before performing the actual write to tape. This prevents improper write appends and reduces the likelihood of read temporary errors due to improper appends.

Since the invention herein requires that a previously read IBG position be compared with a current IBG position for the same block that precedes the append point, it is important that the device 40 detects the IBG in the same manner on both passes. If the device 40 utilizes multiple methods for detecting the start of the IBG, it must make status available to the data control 42 which indicates the method of detection used for each corresponding data block.

If the status values indicate that the block did not detect the start of IBG in precisely the same way through both passes, it is not advisable to apply a delta value to the position of the targeted append point since its accuracy can not be guaranteed. In this case the write append operation would be aborted and retried until the previous IBG was reliably detected.

It should be noted that there is a remote possibility that ILS could occur between the time that the delta value is calculated (i.e. read head at point 455) and the time that the append point is reached. For this reason the device 40 must implement a minimum IBG length check to certify that the append was successful and did not result in a short IBG write preceding the first block written during the append operation.

Device 40 can verify a good IBG by starting a long time-out counter when the IBG is first detected following a block. The time-out count value can be programmable and is designed to expire just before the next block is encountered. If the beginning of the next block is detected before the time-out expires, the status of that block will be flagged as a short IBG error. This will, in turn, engage the appropriate error recovery procedure.

While the invention has been described in its preferred embodiments, it is to be understood that the words which have been used are words of description rather than limitation and that changes within the purview of the appended claims may be made without departing from the true scope and spirit of the invention in its broader aspects.

Having thus described the invention, what is claimed as new and what is desired to be secured by Letters Patent is:

1. A tape drive for writing data, at an intended write append location, to a tape mounted therein, comprising:

a read/write head;

a dataflow mechanism for detecting End of Block markers located at the end of data blocks stored on said tape;

means for moving the tape relative to said read/write head;

means for positioning said tape such that said read/write head is proximate to a tape position at least three data blocks upstream of the intended write append location;

means for advancing said tape toward said intended write append location while simultaneously storing at least one tach count corresponding to End of Block positions for said data blocks;

means for stopping said tape after storing said at least one tach count;

means for backhitching said tape such that said read/write head is proximate to a tape position at least three data blocks upstream of said intended write append location; and means for advancing said tape toward said intended write append location, simultaneously comparing said at least one said stored tach count with a current dataflow position indication corresponding to said End of Block markers for said data blocks only while advancing said tape toward said intended write append location and using said comparison to adjust said tape position relative to said write head such that said write append occurs at said intended write append location.

2. The tape drive of claim 1 wherein the tape is positioned proximate to a tape position three data blocks upstream of said intended write append location prior to advancing said tape to store said tach counts.

3. The tape drive of claim 2 wherein said means for storing said tach counts stores three tach counts corresponding to said End of Block markers for each of the three data blocks upstream of said intended write append location.

4. The tape drive of claim 1 wherein if said stored tach count varies from said current dataflow position by more than a predetermined threshold, the write append operation is aborted.

5. The tape drive of claim 4 wherein after the write append operation is aborted, error recovery procedures are invoked.

6. A tape drive for writing data at an intended append location of a tape mounted therein, comprising:

a read/write head;

a dataflow mechanism for detecting End of Block markers located at the end of data blocks stored on said tape;

means for moving the tape relative to said read/write head;

means for storing tach counts corresponding to End of Block markers located on said tape;

means for positioning said tape such that said read/write head is proximate to a tape position at least three data blocks upstream of said intended write append location; and means for advancing said tape toward said intended write append location, simultaneously comparing said stored tach counts with a current dataflow position indication corresponding to said End of Block markers for said data blocks only while advancing said tape toward said intended write append location and using said comparison to adjust said tape position relative to said read/write head such that said write append occurs at said intended write append location.

7. The tape drive of claim 6 wherein the tape is positioned proximate to a tape position three data blocks upstream of said intended write append location prior to advancing said tape and comparing said stored tach counts with said current dataflow position indication.

8. The tape drive of claim 6 wherein if said stored tach count varies from said current dataflow position by more than a predetermined threshold, the write append operation is aborted.

9. A method for appending data to a tape medium, the method comprising the steps of:

receiving a command to write a first data block to said tape medium at a write append point;

determining reference IBG for said first data block;

determining and storing tach count corresponding to an End of Block mark for a second data block immediately upstream of said reference IBG;

positioning said tape medium at a third data block immediately upstream of a second IBG located immediately upstream of said second data block;

acquiring said second data block;

reading said second data block;

detecting an End of Block mark at the termination of said second data block;

determining if said stored tach count is acceptably close to a current tach count;

if said current and said stored tach counts are acceptably close, adjusting said write append point by the difference between said current and said stored tach count.

10. The tape drive of claim 9 wherein if said current and said stored tach counts are not acceptably close, the write append operation is aborted.

11. The method of claim 9 wherein the location of said reference IBG is determined by read-write head gap length and the block sizes of said second and third data blocks.

12. The method of claim 9 wherein said reference IBG is located immediately upstream of the data block preceding the write append point.

13. The method of claim 9 wherein said reference IBG is located one IBG upstream of the IBG immediately upstream of the data block preceding the write append point.

14. A method for performing a write append operation to a tape medium mounted in a tape device having a read/write head, said method comprising the steps of:

positioning said tape medium such that said read/write head is proximate to a tape position at least three data blocks upstream of an intended write append location;

advancing said tape medium toward said intended write append location while simultaneously storing at least one tach count corresponding to End of Block positions for said data blocks;

stopping said tape medium after storing said at least one tach count;

backhitching said tape medium such that said read/write head is proximate to a tape position at least three data blocks upstream of said intended write append location;

advancing said tape medium toward said intended write location, simultaneously comparing said at least one said stored tach count with a current dataflow position indication corresponding to said End of Block markers for said data blocks only while advancing said tape medium toward said intended write location and using said comparison to adjust said tape position relative to said read/write head such that said write append occurs at said intended write append location.

15. The tape drive of claim 14 wherein the tape is positioned proximate to a tape position three data blocks upstream of said intended write append location prior to advancing said tape to store said tach counts.

16. The tape drive of claim 15 wherein said means for storing said tach counts stores three tach counts corresponding to said End of Block markers for each of the three data blocks upstream of said intended write append location.

17. A method for performing a write append operation at an intended write append location to a tape mounted in a tape device having a read/write head, wherein interlayer slip (ILS) due to forward and reverse motions of said tape is accurately accounted for during tape advance motions only, said method comprising steps of:

storing tach counts corresponding to End of Block markers located on said tape;

positioning said tape such that said read/write head is proximate to a tape position at least three data blocks upstream of said intended write append location;

advancing said tape toward said intended write append location, simultaneously comparing said stored tach counts with a current dataflow position indication corresponding to said End of Block markers for said data blocks only while advancing said tape toward said intended write append location and using said comparison to adjust said tape position relative to said read/write head such that said write append occurs at said intended write append location.

18. The tape drive of claim 17 wherein the tape is positioned proximate to a tape position three data blocks upstream of said intended write append location prior to advancing said tape and comparing said stored tach counts with said current dataflow position indication.

* * * * *

UNITED STATES PATENT AND TRADEMARK OFFICE
CERTIFICATE OF CORRECTION

PATENT NO. : 5,475,542
DATED : December 12, 1995
INVENTOR(S) : S. B. BENTLEY, et al.

It is certified that error appears in the above-indentified patent and that said Letters Patent is hereby corrected as shown below:

Claim 15:

| | | |
|---|---|---|
| Column 12, | Line 50 | After the second occurance of "tape", insert --medium-- |
| | Line 55 | After "tape", insert --medium--. |

Signed and Sealed this

Twenty-fifth Day of June, 1996

Attest:

BRUCE LEHMAN

Attesting Officer     Commissioner of Patents and Trademarks